United States Patent
Bragado Carrasco et al.

(10) Patent No.: US 7,373,384 B2
(45) Date of Patent: May 13, 2008

(54) SHORT MESSAGE (SMS) STORAGE SYSTEM

(75) Inventors: Loreto Bragado Carrasco, Madrid (ES); Fernando Molina Zamora, Madrid (ES); Ana Garcia Robles, Madrid (ES)

(73) Assignee: Vodafone Group PLC (GB)

( * ) Notice: Subject to any disclaimer, the term of this patent is extended or adjusted under 35 U.S.C. 154(b) by 0 days.

(21) Appl. No.: 10/498,190

(22) PCT Filed: Dec. 9, 2002

(86) PCT No.: PCT/ES02/00584

§ 371 (c)(1),
(2), (4) Date: Nov. 23, 2004

(87) PCT Pub. No.: WO03/051075

PCT Pub. Date: Jun. 19, 2003

(65) Prior Publication Data

US 2005/0064882 A1     Mar. 24, 2005

(30) Foreign Application Priority Data

Dec. 10, 2001   (ES) ................. 200102734

(51) Int. Cl.
*G06F 15/16* (2006.01)
(52) U.S. Cl. ............. 709/206; 709/203; 709/216; 709/219; 709/232; 455/412.1; 455/466
(58) Field of Classification Search .......... 709/206, 709/232, 203, 216–217, 219; 455/466, 403, 455/412.1; 379/93.01, 100.08, 201.1, 93.03
See application file for complete search history.

(56) References Cited

U.S. PATENT DOCUMENTS 5,351,235 A * 9/1994 Lahtinen ............... 370/259

(Continued)

FOREIGN PATENT DOCUMENTS

| WO | WO 9802007 | 1/1998 |
| WO | WO 9802007 A1 * | 1/1998 |

OTHER PUBLICATIONS

International Search Report dated Mar. 10, 2003.

*Primary Examiner*—Oanh Duong
(74) *Attorney, Agent, or Firm*—Ostrolenk, Faber, Gerb & Soffen, LLP

(57) ABSTRACT

It comprises a Short Message Service Center (2) (SMSC), STP nodes (4) (Signal Transfer Point), Home Location Register (3) (HLR) and Visitor Location Register (VLR); it is characterized in that it comprises additional SMS storage means (5) and storage means (3 or 4) of an identification of said additional SMS storage means (5), which relates the identification of the means (5) with their address in the mobile network, so that when sending a number corresponding to the identification of the means (5), means (3 or 4) are consulted, from which means the address of the network associated with the identification used as a VLR address for sending the SMS to means (5) is obtained, being stored in these means as if they were a mobile terminal. Storage is carried out such that each mobile terminal subscriber uses the identification of the means (5) for sending an SMS, which had previously been received or generated, in the same manner as it does when it sends an SMS to another mobile terminal.

13 Claims, 2 Drawing Sheets

U.S. PATENT DOCUMENTS

| | | | |
|---|---|---|---|
| 5,577,102 A * | 11/1996 | Koivunen | 455/433 |
| 5,682,600 A * | 10/1997 | Salin | 455/422.1 |
| 5,768,509 A * | 6/1998 | Gunluk | 709/203 |
| 5,943,399 A * | 8/1999 | Bannister et al. | 379/88.17 |
| 6,044,275 A * | 3/2000 | Boltz et al. | 455/466 |
| 6,125,281 A * | 9/2000 | Wells et al. | 455/466 |
| 6,263,212 B1 * | 7/2001 | Ross et al. | 455/466 |
| 6,370,390 B1 * | 4/2002 | Salin et al. | 455/466 |
| 6,424,829 B1 * | 7/2002 | Kraft | 455/412.1 |
| 6,633,764 B1 * | 10/2003 | Garcia | 455/466 |
| 6,665,531 B1 * | 12/2003 | Soderbacka et al. | 340/7.21 |
| 6,674,860 B1 * | 1/2004 | Pirila | 380/247 |
| 6,731,926 B1 * | 5/2004 | Link et al. | 455/412.2 |
| 6,754,484 B1 * | 6/2004 | Hiltunen et al. | 455/412.1 |
| 7,082,312 B2 * | 7/2006 | Zhang et al. | 455/466 |
| 2002/0006784 A1 * | 1/2002 | Kim | 455/412 |
| 2002/0009986 A1 * | 1/2002 | Bern et al. | 455/412 |
| 2002/0019243 A1 * | 2/2002 | Zhang et al. | 455/466 |
| 2002/0173319 A1 * | 11/2002 | Fostick | 455/466 |

\* cited by examiner

SHORT MESSAGE (SMS) STORAGE SYSTEM

OBJECT OF THE INVENTION

The invention at hand consists of a short message (SMS) storage system whose object is to broaden the possibilities of the currently widely used Short Message Service by means of the incorporation in the mobile telephone network itself of additional short message SMS storage means, which a mobile terminal subscriber intentionally accesses for either storing his/her messages for a longer time, and to subsequently be able to recover them when he/she wishes, or for carrying out certain operations on the messages, such as re-sending them to a personal electronic mail account or to another mobile terminal.

Therefore, by means of the system of the invention, a message which has been received in a mobile terminal or which had previously been created therein, can be intentionally stored in the mobile telephone network at the subscriber's will, such that he/she can access the SMS when he/she so wants. To do so, the subscriber dials on his/her mobile terminal an identifying number of the additional SMS storage means provided in the mobile telephone network itself, providing SMS storage means other than those used by the mobile terminals themselves.

BACKGROUND OF THE INVENTION

Sending short messages SMS through the GSM (Global System for Mobile Communications) network or the UMTS (Universal Mobile Telecommunications Service) network is known, the mobile telephone network thereby comprises a Short Message Service Center (SMSC) through which SMS are sent from a sender mobile terminal, or from internet by means of a web interface, to another recipient mobile terminal, the SMSC thereby receiving the SMS and the recipient mobile terminal number (International Mobile Station ISDN Number (MSISDN)) in order to request information on the location of the recipient mobile terminal from a Home Location Register (HLR). Access to the HLR is carried out through an STP (Signal Transfer Point) node, such that from the recipient terminal MSISDN, the HLR obtains the recipient International Mobile Subscriber Identity (IMSI) and Visitor Location Register (VLR) in which the recipient mobile terminal is registered. The VLR register indicates the area in which the recipient mobile terminal is registered.

The HLR responds sending a message of these obtained recipient mobile terminal data to the SMSC, which transmits a new order to send the SMS to the VLR belonging to the obtained date so that the VLR sends the. SMS to the recipient mobile terminal. Once the SMS is received in the recipient mobile terminal, the latter confirms receipt of the SMS, and in case of not being available at that time, the SMSC receives confirmation that the mobile terminal is not available, it thereby stores the SMS for a certain, pre-established time period, for its subsequent automatic sending when the recipient mobile terminal is available, as long as the established time period has not elapsed since, once the time has elapsed, the SMS is deleted.

It is also possible to send short messages to an external application from the SMSC and by direct connection with the latter, using protocols such as SMPP (Short Message Point to Point protocol).

In any case, no copy of the short message remains in any node of the network, but rather it can only be visualized in the recipient mobile.

By means of the described structure, the subscriber has no way of accessing his/her messages if the network does not automatically send them, he/she does not even have a way of knowing if he/she has messages pending delivery.

In Spanish patent application number 9901879, belonging to the same holder as the present invention, a short message receipt, storage and sending system is disclosed, comprising independent SMS storage means where said SMS are stored for their subsequent sending to the recipient mobile terminal, and all this transparently for the sending mobile terminal subscriber, such that an intermediate short message storage means is obtained between the SMSC and the one used in the network, but there is no formula in the network for a subscriber to be able to voluntarily store the messages he/she has received or created in his/her mobile terminal, or created in any other application permitting this. This new function may be very useful, given the limitation mobile terminals have, and since this is the only means that subscribers have of storing their messages, i.e. there is no alternative to the mobile terminal and with many more messages than what can be voluntarily stored in his/her terminal, and which subsequently can be accessed or resent to an external application or to another mobile terminal.

SUMMARY OF THE INVENTION

To achieve the previously mentioned objectives, the invention has developed a short message (SMS) storage system characterized in that it comprises additional SMS storage means and storage means of an identification of those additional SMS storage means, which relate the identification with the address in the mobile network of the means (5), so that when an SMS is sent to the additional SMS storage means using its identification, these means access means which univocally relate said identification with a VLR address, this address corresponding with the address of the additional SMS storage means, such that when the SMS sent from a mobile terminal to the SMSC refers to the identification of the additional SMS storage means, then the SMS is sent to the additional SMS storage means as if they were a VLR, and it is also stored in these as if they were a mobile terminal. Together with the stored SMS, the identification of the mobile terminal which sent the SMS and other SMS data are stored.

Therefore, a mobile terminal subscriber uses the identification of the additional SMS storage means for sending an SMS, which he/she had previously received or previously generated in his/her mobile terminal, in the same manner as when an SMS is sent to another recipient mobile terminal.

In an embodiment of the invention, the storage means of an identification of the additional SMS storage means comprise the STP data base (described in the section of Background of the Invention). In this case, the means univocally relating said identification with a VLR are provided in the additional SMS storage means, so that when a subscriber wishes to store an SMS in the additional storage means, the STP accesses the additional SMS storage means, sending to them the VLR address as if they were an HLR. Accordingly, the SMSC sends the message to the additional SMS storage means upon obtaining its address and identifying the address with a VLR, which permits carrying out the operation.

It is worth indicating that in the network, there are normally a plurality of STPs, in this case, the identification of the additional SMS storage means is stored in all the STPs, since obtainment of the identification can be carried out in any of the STPs, depending on the area where the mobile telephone which is sending the message is located.

In another embodiment of the invention, the storage means of an identification of the additional SMS storage means are constituted in an HLR, and the means univocally relating said identification to the address of a VLR are provided in the HLR, so that when a subscriber wishes to store an SMS in the additional storage means, the STP accesses the HLR, which sends the VLR address referring to the address of the additional SMS storage means, as if the SMS were sent to another mobile terminal, the SMSC sending the SMS to the obtained VLR address belonging to the additional SMS storage means, said SMS being thereby stored in said additional storage means.

In any case, every time the additional SMS storage means receive an SMS, they generate a message receipt confirmation, confirmation which is sent to the SMSC, such that the SMSC identifies that the message has been correctly delivered, considering the task to be concluded and accordingly not carrying out any other action thereon.

To obtain the functionality mentioned in the previous embodiments, the additional SMS storage means comprise a storage data base of the relevant SMS fields, as well as storage of the data corresponding to subscribers, such as the subscriber identification data and message service profile, i.e., the manner of operating with messages according to the needs of each subscriber.

Furthermore, the additional SMS storage means comprise an interface with the mobile telephone network which permits communication with the different nodes of said network, for which it uses the protocol used therein which, in the case of the GSM network, is the MAP (Mobile Application Part) protocol. Furthermore, said interface translates the network protocol into a series of orders for carrying out different message storage, consultation or re-sending functions.

The interface with the mobile telephone network also permits access to the stored messages through the subscriber mobile terminal.

It is also possible that access is permitted from any external machine by means of a subscriber identifier and a password, therefore the additional SMS storage means comprise a message download and configuration interface. In an embodiment of the invention, this interface is of the web type, where the server is the additional SMS storage means, and the clients are all the service subscribers.

The message download or configuration interface comprises means for defining a personal e-mail address, such that the message service profile can comprise the function of re-sending messages to an e-mail address defined in the configuration interface.

Furthermore, the additional SMS storage means comprise an internal management module by means of which proper system functioning is controlled, according to the orders received from the different interfaces, and according to the message service profile stored in the additional SMS storage means. They are also responsible for translating SMS stored in the data base to an e-mail.

The message service profile of each subscriber stored in the additional SMS storage means data base is defined with the message download or configuration interface so as to permit carrying out the manual or automatic re-sending of the SMS to an e-mail address also stored in the data base.

The profile is constituted of the sending criteria group for each subscriber and is characteristic of the latter.

Furthermore, the system of the invention comprises means which permit re-sending the SMS to a mobile terminal. These means are constituted of the internal management module and of the message download and configuration interface which can use different protocols for connecting to another external application, which sends the SMS through the mobile network, since directly linking through the mobile network would involve greater complexity in the STP to permit this functionality.

Therefore, by means of the system of the invention, a series of additional functionalities other than those existing in the convention SMS sending system are provided, since a short message storage alternative is provided, such that the subscriber has message storage means with a greater capacity and reliability than the subscriber mobile terminal.

To help better understand this specification and forming an integral part thereof, a series of drawings are attached below which, with an illustrative and non-limiting character, show the object of the invention.

DESCRIPTION OF THE PREFERRED EMBODIMENT

Figure 1:
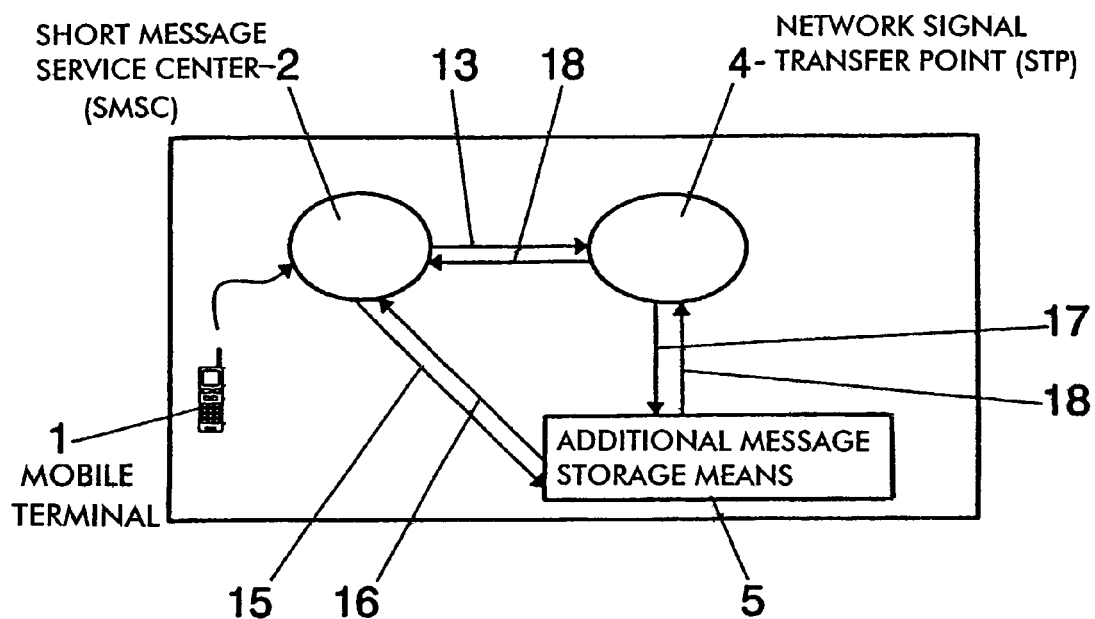
FIG. 1 shows a functional block diagram of the general structure of the system of the invention according to an embodiment example.

A description of the invention is made below based on the aforementioned figures.

First, the conventional short message (SMS) sending process is described which is necessary for understanding the system of the invention. It is known that to send an SMS from a mobile terminal 1, or from a processor through internet, by means of the corresponding interface, to a recipient mobile terminal, the mobile telephone communications network comprises a Short Message Service Center 2 (SMSC) which receives the SMS which includes the recipient Mobile Station International ISDN Number (MSISDN) from which it requests information of the recipient mobile terminal, it therefore makes a consultation 13 with a Home Location Register 3 (HLR) through a network Signal Transfer Point 4 (STP).

For the STP 4 to send the consultation to the HLR, the former is provided with a range table which indicates the HLR address in which the subscriber of the recipient mobile terminal is provided.

The HLR 3 is a data base where network subscriber data are stored, data such as their International Mobile Subscriber Identity (IMSI) of the recipient mobile terminal, its MSISDN and the VLR (Visitor Location Register) in which the recipient mobile terminal is registered at that time.

The VLR is a data base in which, among other data, the location of every one of the mobile terminals is stored, such that every time a mobile terminal changes from location area, its data are stored in the corresponding VLR covering that area, and from the VLR, the subscriber information existing in the HLR is updated.

The HLR responds with information 14 in which the IMSI and VLR of the recipient mobile terminal are indicated, transparently processing this information through the STP 4 to the SMSC 2 which, upon receiving the data, sends the short message to the obtained VLR, from which it is sent to the recipient mobile terminal which, upon receiving the message, sends a message receipt confirmation signal which reaches the SMSC 2, which considers the operation concluded.

In case the recipient mobile terminal is not operative and/or the confirmation message is not received, the VLR sends a message to the SMSC 2 that the recipient mobile terminal is not available, and the short message is stored in SMSC 2 for a previously programmed time period, during which time, when the VLR detects that the recipient mobile terminal is operative, it sends the message as previously mentioned. If communication is not set up with the recipient mobile terminal during the programmed SMS storage time in the SMSC, the SMS is deleted without the recipient mobile terminal subscriber finding out that he/she had a message.

The novelty of the invention is based on the fact that instead of sending the message to a recipient mobile terminal, the subscriber of the mobile terminal 1 sends it to additional SMS storage means 5 materialized in an SMS mailbox, he/she therefore dials an exclusive identifying number of the mailbox 5 and sends the message the same way as if they were a recipient mobile terminal, the message being stored in the mailbox 5, as if it were a mobile terminal, which mailbox can be subsequently accessed, or the messages can be re-sent, as will be described below.

To achieve this functionality, in an embodiment example of the invention (FIG. 1), an exclusive identifying number of the mailbox 5 belonging to the number typed by the subscriber of the mobile terminal 1 is incorporated in the STP 4 data base, such that the STP 4 forwards a consultation 17 to the mailbox 5, which responds, returning the address of a VLR whose address corresponds to the address of the mailbox 5, as if it were an HLR, such that said address reaches the SMSC 2 and the latter conventionally interprets the VLR address, and accordingly carries out the sending 15 of the short message to the mailbox 5, which confirms 16 receipt of the message, as if it were a VLR, the SMSC 2 considering the operation to be concluded, and the message being stored in the mailbox 5.

It is worth mentioning that the data base used by the STP 4 for forwarding the consultation 17 to the mailbox 5 is its range table, which is conventional, which previously stores the identification number of the mailbox 5, associated with its address in the mobile network.

In the embodiment example, only one STP has been shown, and it is worth mentioning that the network can include a plurality of STPs 4, therefore the mailbox 5 must be included in each and every one of the range tables of the STPs 4 to obtain access to the mailbox 5 in any case, regardless of the STP 4 which is accessed.

Figure 2:
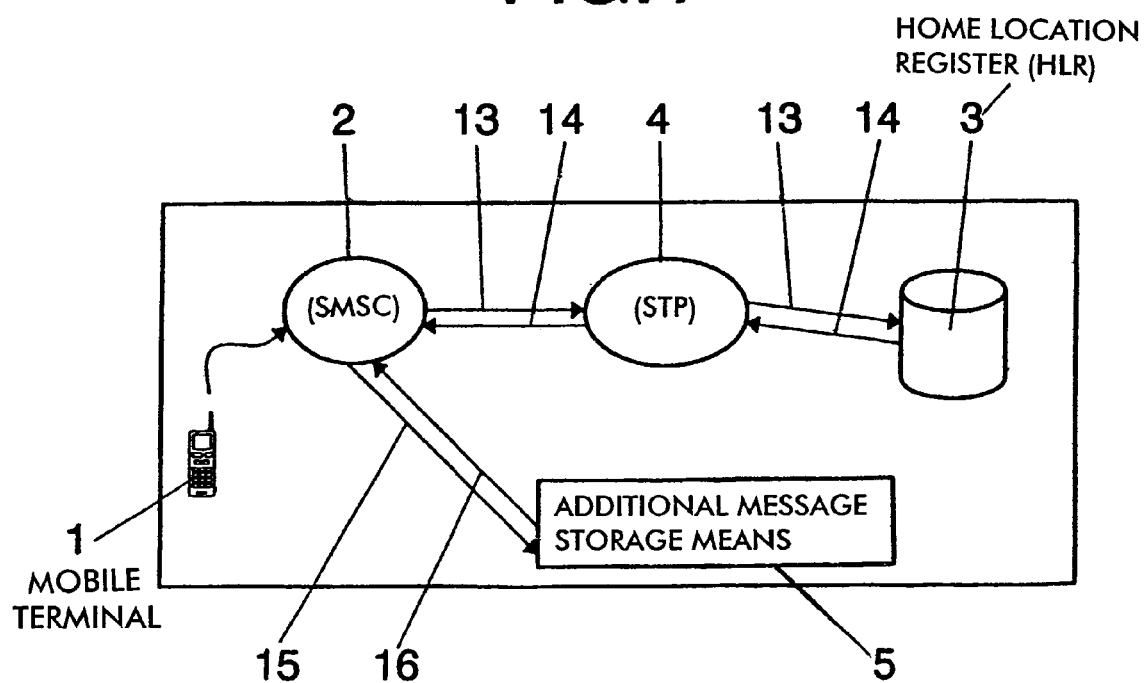
FIG. 2 shows a functional block diagram of the general structure of the system of the invention according to another embodiment of the invention.

In another embodiment example (FIG. 2), when an SMSC 2 receives a message to be stored in the mailbox 5, the consultation 13 to the HLR 3 is made through the STP 4 in a conventional manner, but with the particularity that in this case, the HLR 3 includes a table which univocally relates the identification of the mailbox 5 with a VLR address, which address corresponds to the address of the mailbox 5, such that the HLR 3 responds with the information 14 corresponding to the VLR belonging to the address of the mailbox 5, therefore when it receives this data, the SMSC 2 sends 15 the message to the mailbox 5 which responds 16 confirming receipt of the message, the SMSC 2 considering the operation to be concluded, and the message being equally stored in the mailbox 5.

Figure 3:
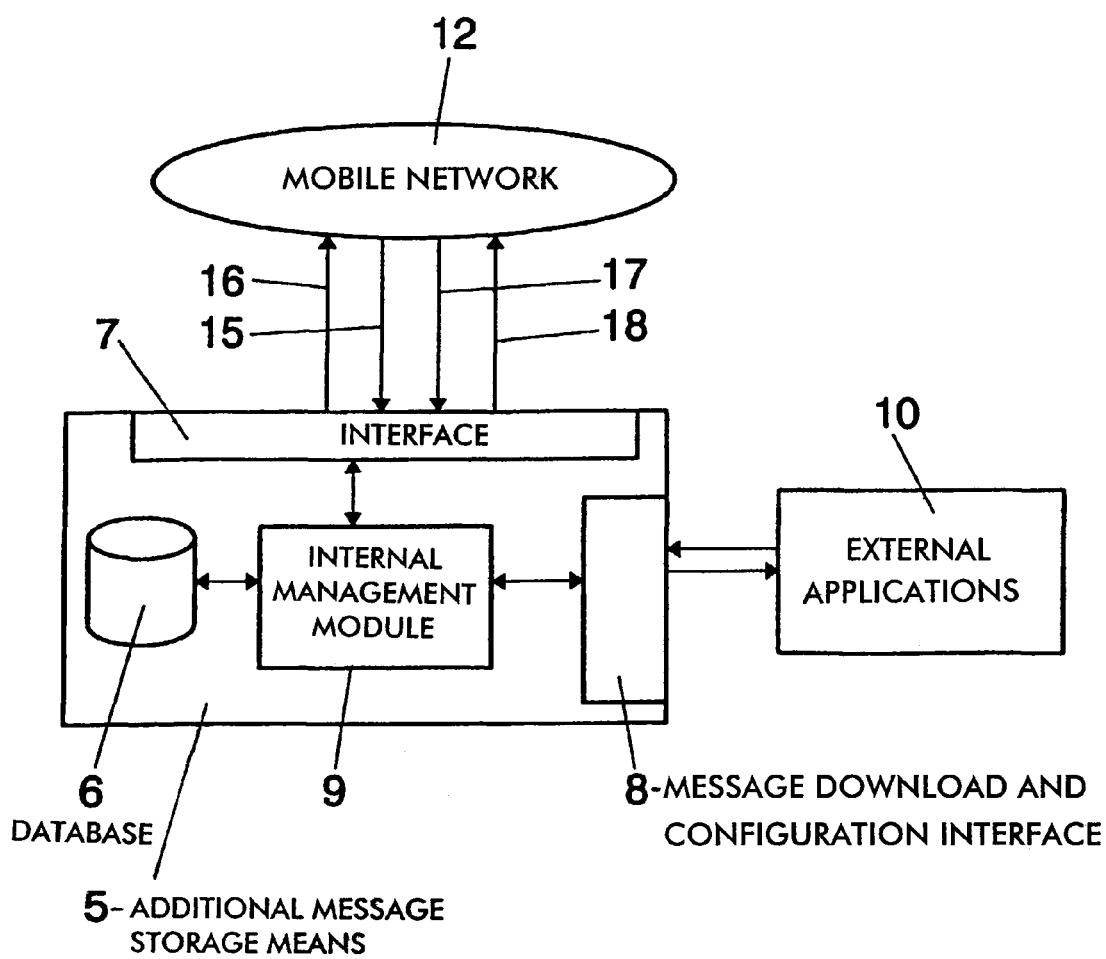
FIG. 3 shows a functional block diagram of a possible embodiment example of the additional SMS storage means shown in the previous figures.

To achieve the functionality of the mailbox 5 described in the previous examples, the mailbox is provided with an interface 7 with the mobile telephone network (FIG. 3) consisting of a MAP (Mobile Application Part, which is the signaling protocol corresponding to the mobile telephone network application part) interface which receives the MAP protocol signals and translates them to be delivered to an internal management module 9 which carries out the internal management of the mailbox 5. The module 9 accesses a data base 6 where the subscriber identification data are stored and the message service profile is set up for each client. Furthermore, in the embodiment example described with the help of FIG. 1, the data base includes the VLR address belonging to the mailbox 5.

Furthermore, the messages sent in the described manner are stored in the data base together with the sender mobile terminal identification so as to permit access to the stored messages as, described below.

To achieve this functionality, the management module 9 is connected to a message download and configuration interface 8 connected to an e-mail server to permit re-sending the messages to an e-mail address. For example, the interface 8 can be WEB type, where the server is the mailbox 5 itself, and the clients are all the service subscribers.

The interface 8 requests an identifier and password for permitting access to messages, which parameters are stored in the data base 6, and once accessed, the stored messages will be shown similarly to how e-mails are shown in an e-mail server, for translation into e-mail messages.

The interface 8 incorporates the possibility of configuring a personal e-mail address to which the stored short messages could be re-sent, translating them into e-mail.

Said re-sending is carried out manually or automatically, following certain pre-established criteria such as the date, time, text length, the first characters of the message, such that the subscriber can re-send the message to his/her e-mail address directly, using the mailbox 5 as a gateway.

For sending messages via e-mail, simple and standardized protocols are used, such as SMTP (which is the protocol prepared for downloading and sending e-mail).

It is also worth mentioning that access to the mailbox 5 can be carried out through the mobile terminal through the interface 8, which can use different protocols to connect to another external application communicating with the mobile network for sending the SMS through the network to the mobile terminal. This access can be carried out through WAP services conventionally used in the latest generation of mobile telephones.

This configuration permits that the messages stored in the data base 6, apart from being consulted through the mobile terminal, can be re-sent by order of the terminal to another recipient mobile terminal, suitably configuring the management module 9.

The management module 9 also manages subscriber data and profile, such as identifier and password changes, message delivery profile data and the automatic sending criteria.

The invention claimed is:

1. A short message storage system operable to store short messages sent from a sender mobile terminal and to provide user access to the stored short messages, the system comprising:

a Short Message Service Center operable to receive a short message from the sender mobile terminal and for forwarding the short message to a recipient mobile terminal;

said Short Message Service Center being operative to access through a Signal Transfer Point node, a Home Location Register for obtaining information corresponding to information stored in a Visitor Location Register in which the recipient mobile terminal is registered and an International Mobile Subscriber Identification of said recipient mobile terminal;

said Short Message Service Center being operable to deliver the short message to the recipient mobile terminal through said Visitor Location Register;

a short message storage operable to store the short message received;

an identification storage operable to store an identification of said short message storage, and to access a database relating said identification with a storage address having a Visitor Location Register address format, when the short message received includes said identification;

the Short Message Service Center operable to forward the message received to the short message storage at said storage address, when the short message received by the Short Message Service Center refers to the identification of the short message storage; and said short message storage operable to store the short message together with an identification of the first mobile terminal that sent the short message, and to re-send the short message, according to a receipt of a user command requesting the re-sending, to another recipient terminal.

2. The system according to claim 1, wherein:

the identification storage is a Signal Transfer Point database operable to relate said identification with a storage address is provided in the short message storage, and the Signal Transfer Point is operable to access the short message storage, when the sender mobile terminal sends the short message referring to the identification of said short message storage, and the short message storage is operable to return the storage address.

3. The system according to claim 2, wherein the short message storage, when receiving the short message, is operable to generate a message receipt confirmation, and to return said message receipt confirmation to the Short Message Service Center.

4. The system according to claim 2, wherein the short message storage comprises a storage database operable to store fields of short messages and data corresponding to subscribers, including subscriber identification data and a message service profile.

5. The system according to claim 4, wherein the short message storage further comprises an internal management module arranged for controlling system functioning according to a user command received via an interface.

6. The system according to claim 2, wherein the short message storage comprises an interface with a mobile telephone network for communication with nodes of said network.

7. The system according to claim 6, wherein the interface with the mobile telephone network is a Mobile Application Part interface.

8. The system according to claim 2, wherein the short message storage comprises a message download and configuration interface operable to access stored short messages from outside of a mobile telephone network and/or from a mobile terminal or any external machine by means of a user identifier and password, the external machine in turn operable to provide to the mobile telephone network access to the short message and to re-send messages to another recipient mobile terminal.

9. The system according to claim 8, wherein the message download and configuration interface is of a web type interface, where the short message storage comprises a server, and clients are subscribers to a service for storage of short messages in the short message storage.

10. The system according to claim 8, wherein the message download and configuration interface is operative to configure a personal e-mail address for the re-sending of the short messages and to forward an e-mail containing the short message to the e-mail address.

11. The system according to claim 10, wherein the re-sending of the short message is performed manually or automatically, according to criteria previously established in the message download and configuration interface.

12. The system according to claim 2, wherein the identification of the short message storage is stored in the Signal Transfer Points database.

13. The system according to claim 1, wherein:

the identification storage is provided in the Home Location Register, the database is provided in the Home Location Register, and the Short Message Service Center is operable to access the Home Location Register through the Signal Transfer Point, when the sender mobile terminal sends the short message referring to the identification of the short message storage, and the Home Location Register is operable to return the storage address.

* * * * *